(No Model.)

S. J. SAXON.
CHURN.

No. 489,833.  Patented Jan. 10, 1893.

WITNESSES:
F. McArdle
C. Sedgwick

INVENTOR:
S. J. Saxon
By Munn & Co.
ATTORNEYS

UNITED STATES PATENT OFFICE.

SILAS J. SAXON, OF COLFAX, WASHINGTON.

CHURN.

SPECIFICATION forming part of Letters Patent No. 489,833, dated January 10, 1893.

Application filed July 5, 1892. Serial No. 438,946. (No model.)

*To all whom it may concern:*

Be it known that I, SILAS J. SAXON, of Colfax, in the county of Whitman and State of Washington, have invented a new and Improved Churn, of which the following is a full, clear, and exact description.

My invention relates to improvements in churns and especially to that variety of churns shown in Letters Patent of the United States, granted to W. W. Perkins, No. 374,753, dated December 13, 1887. In the form of churn shown in the patent referred to, eddying currents are generated but they meet with too little resistance to cause the cream to be quickly turned to butter, and the dasher used in said churn is objectionable from the fact that it is difficult to clean and the cream does not pass readily through it.

The object of my invention is to produce a churn of simple construction which may be cheaply made and easily operated, which is provided with no independent cream vessel inside of the churn body, which is adapted to impart a quick rotary movement to the cream, which is also provided with fixed wings or abutments which quickly change said currents, and which, by reason of the construction just described, is adapted to bring butter quickly and to extract all the butter from the cream.

To this end my invention consists in a churn, the construction of which will be hereinafter described and claimed.

Reference is to be had to the accompanying drawings forming a part of this specification, in which similar figures of reference indicate corresponding parts in all the views.

Figure 1:
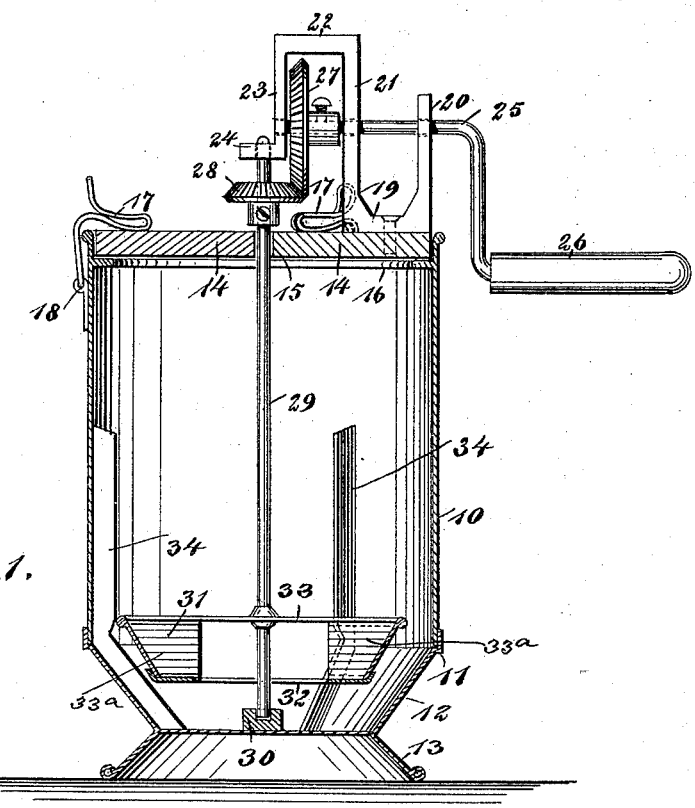
Figure 2:
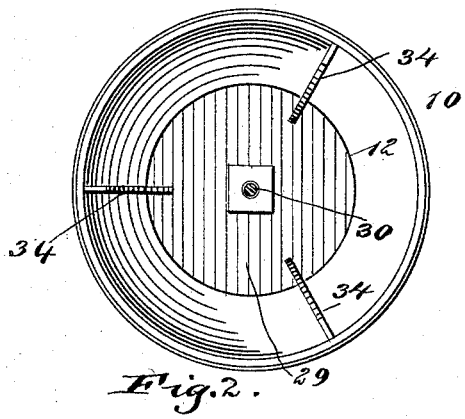
Figure 3:
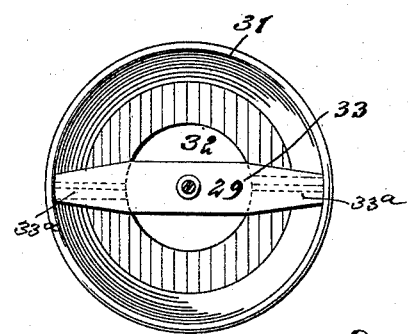

Figure 1 is a central vertical section of the churn embodying my invention; Fig. 2 is a plan of the same with the cover removed and with the center shaft in section; and Fig. 3 is a detail plan of the dasher.

The churn is provided with a cylindrical body 10 which at its lower end rests upon the annular shoulder 11 of a tapering bottom 12, and this bottom rests upon and is preferably formed integral with a spreading base 13. The churn is provided with a removable cover, preferably made of two parts 14, which have center grooves or recesses 15 which meet and form an aperture in which the center shaft turns, and the cover rests upon a flange 16 on the inner portion of the churn body. The cover is held in place by swinging fastening hooks 17 which are hinged to lugs 18 on the side of the body near the top, the fastening hooks being adapted to swing up over the top and press downward upon the cover. On one side of the cover is a bracket having a base portion 19 which is firmly secured to the cover and upwardly extending arms 20 and 21 which form supports for the crank shaft, the arm 21 being bent at a right angle parallel with the shaft at the top, as shown at 22, and this top portion terminates in a depending arm 23 which is parallel with the shaft 21, and the arm 23 terminates at its lower end in a horizontal portion 24 which serves as a bearing for the center shaft. A crank shaft 25 having a suitable handle 26 is journaled in the arms 20, 21 and 23, of the bracket, the shaft having at its inner end a vertically rotating beveled gear wheel 27 which meshes with a pinion 28 on the vertical center shaft 29, and the latter extends through the center of the churn body, the upper end being journaled in the horizontal portion 24 of the bracket, and its lower end being stepped in a suitable bearing 30 in the churn bottom. It will be noticed that the bracket on the cover thus forms a simple and very substantial support for both the crank shaft and the center shaft. The shaft 29 carries, near its lower end, a cup shaped dasher 31 which is open at the top and which has a large opening 32 in the bottom. The taper of the dasher conforms very nearly to that of the bottom portion 12 of the churn bottom. This construction enables the churn to be used to advantage on a comparatively small portion of cream. The dasher 31 has a brace 33 extending centrally across its top and this brace is securely fastened to the shaft 29. Beneath the brace 33 and secured to it and to the sides and bottom of the dasher, are wings 33ª, the inner ends of which register preferably with the edge of the opening 32 and which when the dasher is revolved, arrest the rotary motion to the cream.

Within the churn body and securely fastened to its walls are vertical wings or abutments 34 which are regularly placed around the churn body, and any desired number of these may be used, although three is a number sufficient for an ordinary churn.

The operation of the churn is as follows:— One member of the cover 14 is removed and the cream poured into the churn, after which the cover is replaced and fastened by the hook 17 and the operator then turns the crank shaft 25. This sets the dasher 31 in rapid motion and the dasher instantly generates rotary currents in the churn and these are obstructed and checked by the fixed abutments or wings 34, so that the cream is very quickly churned and all its parts are put in commotion so that butter is rapidly produced. It will be seen that the open top and bottom of the dasher form no obstructions to the cream, so that the current may pass in and out through the dasher, and it will be understood that the churn and dasher may both be very quickly cleaned. When the butter is to be removed, the cover, the center shaft, and the dasher are lifted from the churn and the butter may then be taken out in the usual way.

Having thus described my invention, I claim as new, and desire to secure by Letters Patent:—

1. A churn, comprising a hollow body having a tapering bottom and a suitable base, a plurality of fixed wings or abutments produced vertically upon the body and within the churn, the lower portions of the abutments extending inward upon the tapering portion of the body, a revoluble and removable driving shaft held to turn vertically in the churn body, and a cup-shaped dasher secured to the driving shaft and held to turn above the lower portions of the fixed abutments, the dasher being open at top and bottom, substantially as described.

2. A churn, comprising a cylindrical body portion having a tapering bottom with a suitable base, and a removable two-part cover, one part carrying a bracket with a crank shaft therein, a plurality of fixed wings or abutments secured to the inner side of the churn body and extending downward to the bottom, a removable shaft held to turn in the churn body and geared to the crank shaft on the cover, a cup-shaped dasher secured to the driving shaft and held to turn above the tapering portion of the body, said dasher being open at top and bottom and having wings extending radially inward from its sides, substantially as described.

SILAS J. SAXON.

Witnesses:
WM. H. JAMES,
A. M. CRAVEN.